(12) United States Patent
Vannucci (10) Patent No.: US 7,349,365 B2
(45) Date of Patent: Mar. 25, 2008

(54) MOBILE TELEPHONE MESSAGING BY BASEBAND ENVELOPE MODULATION

(75) Inventor: Giovanni Vannucci, Red Bank, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1117 days.

(21) Appl. No.: 10/277,709

(22) Filed: Oct. 22, 2002

(65) Prior Publication Data

US 2004/0076129 A1    Apr. 22, 2004

(51) Int. Cl.
*H04Q 7/00* (2006.01)
*H04B 7/216* (2006.01)

(52) U.S. Cl. .................. 370/328; 370/335; 370/441
(58) Field of Classification Search ............. 370/335, 370/441
See application file for complete search history.

(56) References Cited

U.S. PATENT DOCUMENTS

| | | | | |
|---|---|---|---|---|
| 3,626,417 A * | 12/1971 | Gilbert | ............... | 370/204 |
| 3,714,375 A * | 1/1973 | Stover | ............... | 370/204 |
| 3,754,101 A * | 8/1973 | Daspit et al. | ............... | 370/204 |
| 5,347,280 A * | 9/1994 | Schuermann | ............... | 342/42 |
| 5,365,187 A * | 11/1994 | Hornak et al. | ............... | 330/10 |
| 5,610,946 A * | 3/1997 | Tanaka et al. | ............... | 375/269 |
| 5,649,296 A | 7/1997 | MacLellan et al. | ............... | 455/38.2 |
| 5,740,165 A | 4/1998 | Vannucci | ............... | 370/330 |
| 6,072,792 A | 6/2000 | Mazur et al. | ............... | 370/345 |
| 6,130,623 A | 10/2000 | MacLellan et al. | ............... | 340/825.54 |
| 6,141,541 A * | 10/2000 | Midya et al. | ............... | 455/91 |
| 6,242,975 B1 * | 6/2001 | Eidson et al. | ............... | 330/124 R |
| 6,275,685 B1 * | 8/2001 | Wessel et al. | ............... | 455/126 |
| 6,396,341 B1 * | 5/2002 | Pehlke | ............... | 330/10 |
| 6,445,249 B1 * | 9/2002 | Khan et al. | ............... | 330/149 |
| 6,583,729 B1 * | 6/2003 | Gardner et al. | ............... | 340/855.4 |
| 6,717,980 B1 * | 4/2004 | Rishi | ............... | 375/219 |
| 6,751,268 B1 * | 6/2004 | Myers | ............... | 375/296 |
| 2001/0014592 A1 * | 8/2001 | Helms | ............... | 455/91 |
| 2004/0052312 A1 * | 3/2004 | Matero | ............... | 375/295 |
| 2004/0193676 A1 * | 9/2004 | Marks | ............... | 709/203 |
| 2004/0203944 A1 * | 10/2004 | Huomo et al. | ............... | 455/466 |

\* cited by examiner

*Primary Examiner*—Edan Orgad
*Assistant Examiner*—Blanche Wong
(74) *Attorney, Agent, or Firm*—Dirk Brinkman; Clifton D. Mueller; Gene V. Vinokur (57) ABSTRACT

A method and system communicates messages using a radio signal. The radio signal is transmitted according to an air interface standard for wireless radio communications. A baseband envelope of the transmitted radio signal is modulated while maintaining compliance with the air interface standard to encode a message in the radio signal. A receiver demodulates the baseband envelope to decode the message. The transmitter and receiver can be part of a cellular telephone network including mobile telephones and base stations.

27 Claims, 8 Drawing Sheets

MOBILE TELEPHONE MESSAGING BY BASEBAND ENVELOPE MODULATION

FIELD OF THE INVENTION

This invention relates generally to wireless communications systems, and more particularly to locating and identifying mobile telephones, and authenticating transactions made with identified mobile telephones.

BACKGROUND OF THE INVENTION

Figure 1:
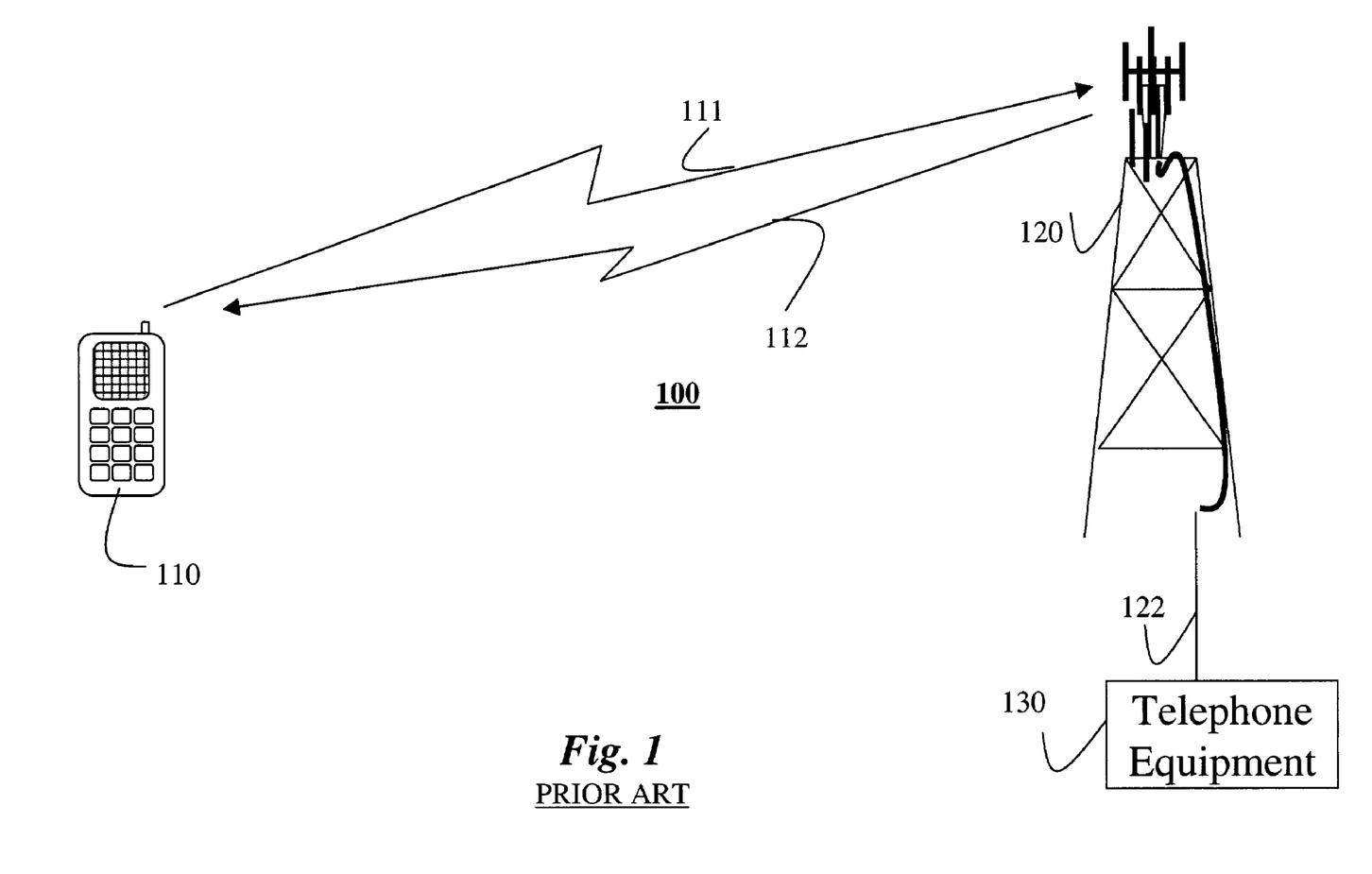
FIG. 1 is a diagram of a prior art mobile telephone communication system.

Mobile telephones are widely used for the convenience of being able to communicate at a variety of locations. FIG. 1 depicts a typical prior art mobile telephone communication system 100. The system comprises a mobile telephone 110, which transmits an uplink radio signal 111 to a base station 120. The base station 120 transmits a downlink radio signal 112 to the mobile telephone. The base station 120 is also connected to telephone equipment 130 through a connection 122 which is usually part of the public switched telephone network (PSTN). The telephone equipment 130 can be any type of telephone, including another mobile telephone or an automated answering unit or a modem connected to a computer. The system 100 provides a point-to-point two-way connection between the mobile telephone 110 and the telephone equipment 130.

As a public service, the need to locate and identify mobile telephones is well known. Much attention has been devoted to a recent FCC requirement that a mobile telephone making an emergency call be located, regardless of where the telephone is in the wireless service area, see FCC E911 Rulemaking Docket No. 94-102. A mobile phone can be located by monitoring its uplink radio transmissions by triangulation or other methods well known in the prior art.

For private services, it would also be useful to be able to locate and identify mobile telephones in the vicinity of a service or goods provider so that mobile telephone initiated transactions can be completed with a high degree of reliability and that are resistant to spoofing and fraud. A typical example of a useful transaction is the execution of a payment using a mobile telephone instead of a credit card.

It is well known that a signal proportional to the envelope of a transmitted radio signal transmitted can be detected, see U.S. Pat. No. 5,649,296 incorporated herein by reference. This signal is commonly called the baseband envelope. Of special interest to the invention are signals transmitted according widely used air interface standards such as global system for mobile communication (GSM) telephones. GSM services include GSM1800, which operates in the 1800 MHz frequency band, also referred to as PCN or PCN 1800, or DCS 1800. GSM1900 operates in the 1900 MHz frequency band, also referred to as PCS 1900 and DCS 1900. GSM900 operates in the 900 MHz frequency band. Also of interest are signals transmitted by mostly Japanese personal digital communication (PDC) devices.

It is desired to use the baseband envelope of signals transmitted by mobile telephones for radio frequency identification (RFID). More specifically, it is desired to identify, authenticate and locate mobile telephones without having to decode the underlying encrypted wireless signal. Furthermore, it would be advantageous to provide for mobile telephone identification without having to modify existing mobile telephones, wireless networks, and wireless communications air interface standards.

It is well known that the envelope of a radio signal can be used to convey information. This is the well-know amplitude modulation (AM) technique. It is understood that the instantaneous amplitude of a radio signal is the same as its envelope. U.S. Pat. No. 6,072,792 issued to Mazur et al. describes a power control apparatus for a TDMA transmitter. The technique described therein is used to reduce interference in the transmitted signal. This allows a receiver to extract the TDMA signal from adjacent time slots.

It is desired to deliberately manipulate the envelope transmitted by a mobile telephone so as to convey information that can be used to achieve the aforementioned RFID without having to modify existing mobile telephones, wireless networks, communications standards, and air interface standards for mobile telephones.

SUMMARY OF THE INVENTION

The invention provides a system and method for conveying an identification, authentication or other kind of message from a mobile telephone to a radio receiver without demodulating or decoding the underlying voice or data signal. Instead, the invention uses modulations of the baseband envelope of the transmitted radio signal. Such communication can advantageously be utilized for identifying a mobile telephone, and for authenticating transactions initiated by the identified mobile telephone.

According to the invention, the mobile telephone modifies the baseband envelope of the transmitted signal to encode a message, while transmitting a voice or data signal using a radio signal that meets the requirements of widely used air interface standard of the mobile telephone, such as, for example, the GSM standard. In one embodiment, the mobile telephone simulates a "voice activity" pattern as is encountered in a normal voice telephone call. Such voice activity pattern results in a corresponding pattern of radio transmission. The simulated voice activity pattern can be adjusted such that the envelope of the corresponding radio transmission pattern conveys an identification or authentication message. A radio receiver adapted to receive the radio transmission and adapted to detect the envelope reconstructs the associated message. The identification message can be used for identifying the mobile telephone, and the authentication message can be used to authorize or complete a commercial transaction. For example, a radio receiver operated by a goods or service provider can authorize a purchase.

The invented technique of generating a simulated voice activity for the purpose of modulating the envelope of a mobile radio signal to carry an identification message can also be applied to the radio transmission from a non-mobile transmitter. For example, during a mobile voice telephone call, the mobile telephone receives a downlink radio signal from a fixed base station. This downlink radio signal is part of a point-to-point connection that enables the telephone conversation and connects the mobile telephone to other telephone equipment. The voice activity of the other telephone equipment determines the pattern of radio transmission in the downlink radio signal. Thus, it is possible for the other telephone equipment to convey a message to a radio receiver operated by a goods or service provider near the mobile telephone.

In particular, a user of a mobile telephone places a call to a predetermined number of an automated answering unit in order to perform a transaction. The wireless portion of the call includes an uplink radio signal, which is received by a fixed base station and by a radio signal detector in the vicinity of the mobile telephone. The detector measures parameters of the uplink radio signal, including, for example, a frequency and a time division multiple access slot (TDMA) of the signal. From the parameters, the detector determines corresponding parameters of the downlink signal transmitted by the base station to be received by the mobile telephone.

The automated answering unit extracts "caller ID" information of the mobile telephone. Using simulated voice activity, the automated answering unit encodes the ID information into a simulated voice signal sent back to the mobile telephone in the downlink signal. The radio signal detector includes a radio receiver responsive to the parameters of the downlink signal and the detector is capable of detecting the envelope of the downlink signal and reconstructing the encoded ID information by the simulated voice activity. The detector can then indicate that the particular transaction can be completed.

DETAILED DESCRIPTION OF THE PREFERRED EMBODIMENT

Envelope Modulation

Figure 2:
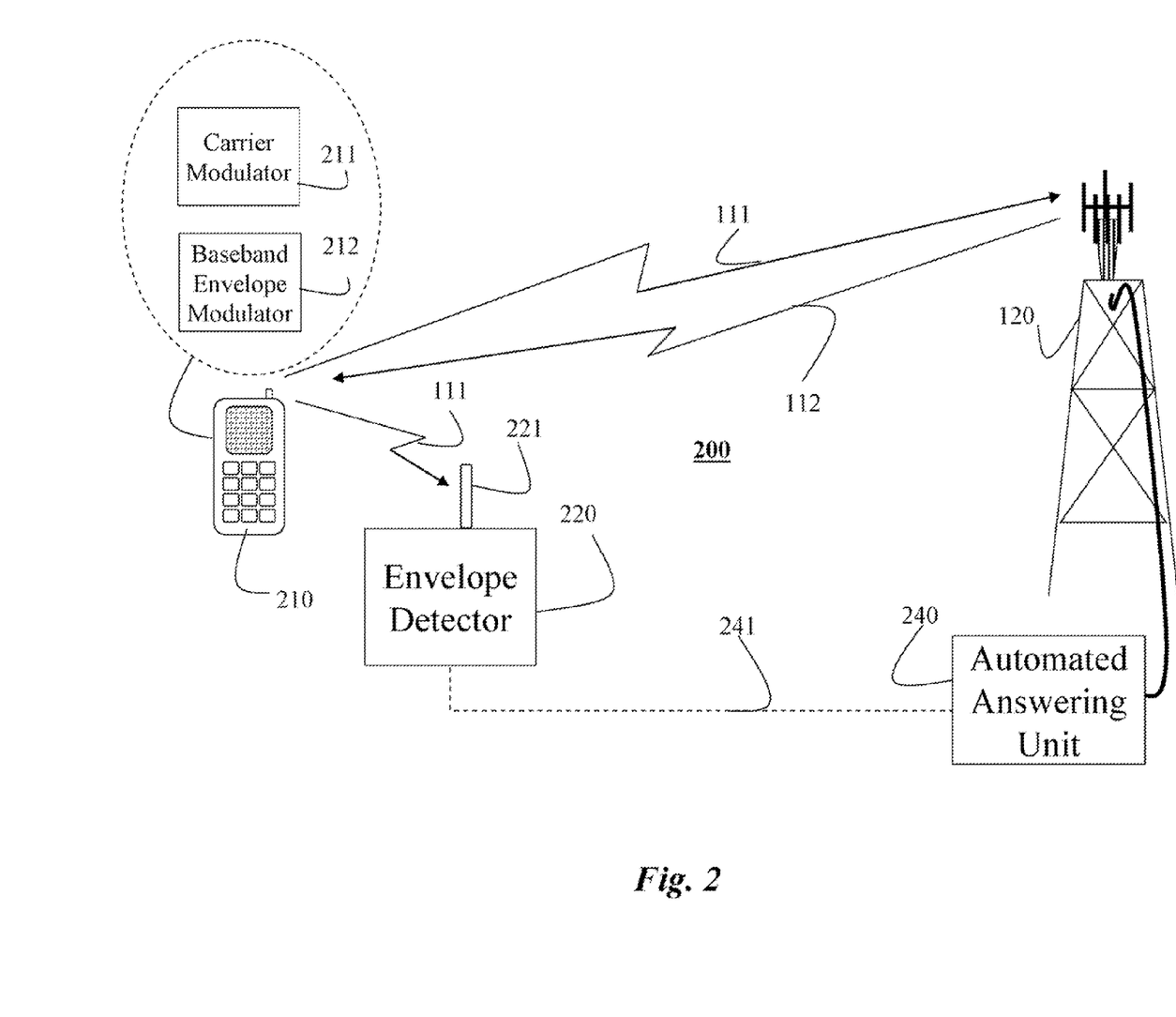
FIG. 2 is a diagram of a mobile telephone communication system employing baseband envelope modulation according to the invention.

FIG. 2 shows a system 200 for conveying an identification, authentication or other kind of message from a mobile telephone 210 to an envelope detector 220 while the mobile telephone 210 transmits the uplink signal 111 that is compliant with an air interface standard to the base station 120. The envelope detector 220 is adapted to receive the uplink signal 111 through an antenna 221. The envelope detector 220 monitors the envelope of the uplink signal 111 while the mobile telephone 210 transmits a voice or data signal to the base station 120. The envelope detector can be located at a place where a user of the mobile telephone 210 would like to complete a transaction, e.g., make a purchase in a store, or buy goods, or services from a vending machine, e.g., an automated ticket dispenser at an airport.

The sensitivity of the envelope detector 220 can be adjusted to ensure that the mobile telephone 210 is within a predetermined distance of the detector so that multiple detectors can be placed quite near each other. For example, if the envelope detector according to the invention is used in automated vending machines, the sensitivity of the detector can be adjusted to be a very small distance, e.g., a centimeter or less, so that the user of the mobile telephone 210 has to place the mobile phone immediately adjacent to the antenna 221 so that another nearby vending machine also equipped with a detector is not erroneously activated. In the case of a check-out counter at a retail sore, the distance of sensitivity can be increased to perhaps a meter or less. Techniques for adjusting the sensitivity of radio receivers to precise distances are well known.

The base station 120 is part of a wireless network that normally is connected to a wired communications network, e.g., the public service telephone network (PSTN) and the Internet.

In the preferred embodiment, the mobile telephone 210 uses time division multiple access (TDMA) air interface standard. With TDMA, each radio channel is divided into multiple time slots in order to increase the amount of data that can be communicated. TDMA was first specified as a standard in EIA/TIA Interim Standard 54 (IS-54). IS-136, an evolved version of IS-54, is the United States standard for TDMA for both the cellular (850 MHz) and personal communications services (1.9 GHz) spectra. TDMA is used by digital-American mobile phone service (D-AMPS), personal digital cellular (PDC), Japanese digital cordless (JDC), and global system for mobile communications (GSM). TDMA is also used for digital enhanced cordless telecommunications (DECT). The global system for mobile communication (GSM) standard. GSM services include GSM1800, which operates in the 1800 MHz frequency band, also referred to as PCN or PCN 1800, or DCS 1800. GSM1900 operates in the 1900 MHz frequency band, also referred to as PCS 1900 and DCS 1900. GSM900 operates in the 900 MHz frequency band.

This description is in terms of the TDMA standard and GSM. However, other similar types of air interface standards, for example, CT-2 and hybrid TDMA/TDD systems, such as the personal handy phone (PHP) and digital European cordless telephone (DECT), can also be used. For the purposes of this description, TDMA, TDD and TDMA/TDD systems shall all be referred to as TDMA systems. Regarding non-TDMA-based standards, the general concepts are still applicable. It should be understood that the present invention can be applied to most second generation (2G) and all third generation (3G) mobile telephones.

While transmitting to the base station 120, the mobile telephone 210 conveys the message to the envelope detector 220 through envelope modulation of the uplink signal 111. The envelope modulation is applied in such a way as to preserve compliance of the uplink signal 111 with an assigned air interface standard, such as, for example, the GSM wireless standard. It should be understood that the present invention is applicable to a wide variety of air interface standards.

In particular, the invention is applicable to all the air interface standards mentioned above. In those standards, the radio carrier is often modulated using digital phase-shift keying, or other digital modulation scheme, for the purpose of encoding a first message from a mobile telephone to a base station. According to this invention, the baseband envelope modulation 212 of the uplink signal 111 is applied to the radio signal concurrently with the digital carrier modulation 211. The choice of envelope modulation for encoding a second message for a nearby envelope detector is advantageous because of the simplicity of implementation of an envelope detector. This is especially true when the bit rate used to encode the second message is low.

In a more secure version, an automated answering unit 240 connected to the base station 120 extracts "caller ID" information of the mobile telephone 210. Using an optional connection 241, the automated answering unit 240 exchanges information with the envelope detector 220. For example, the information can include a verification of the message sent by the mobile telephone 210 to the envelope detector 220 through envelope modulation of the uplink signal 111. Such a verification advantageously improves the security of the transaction and reduces the risk of fraud. The optional connection 241 can be realized in well known fashion, for example, it can be an Internet connection or a wired or wireless telephone connection.

Figure 3:
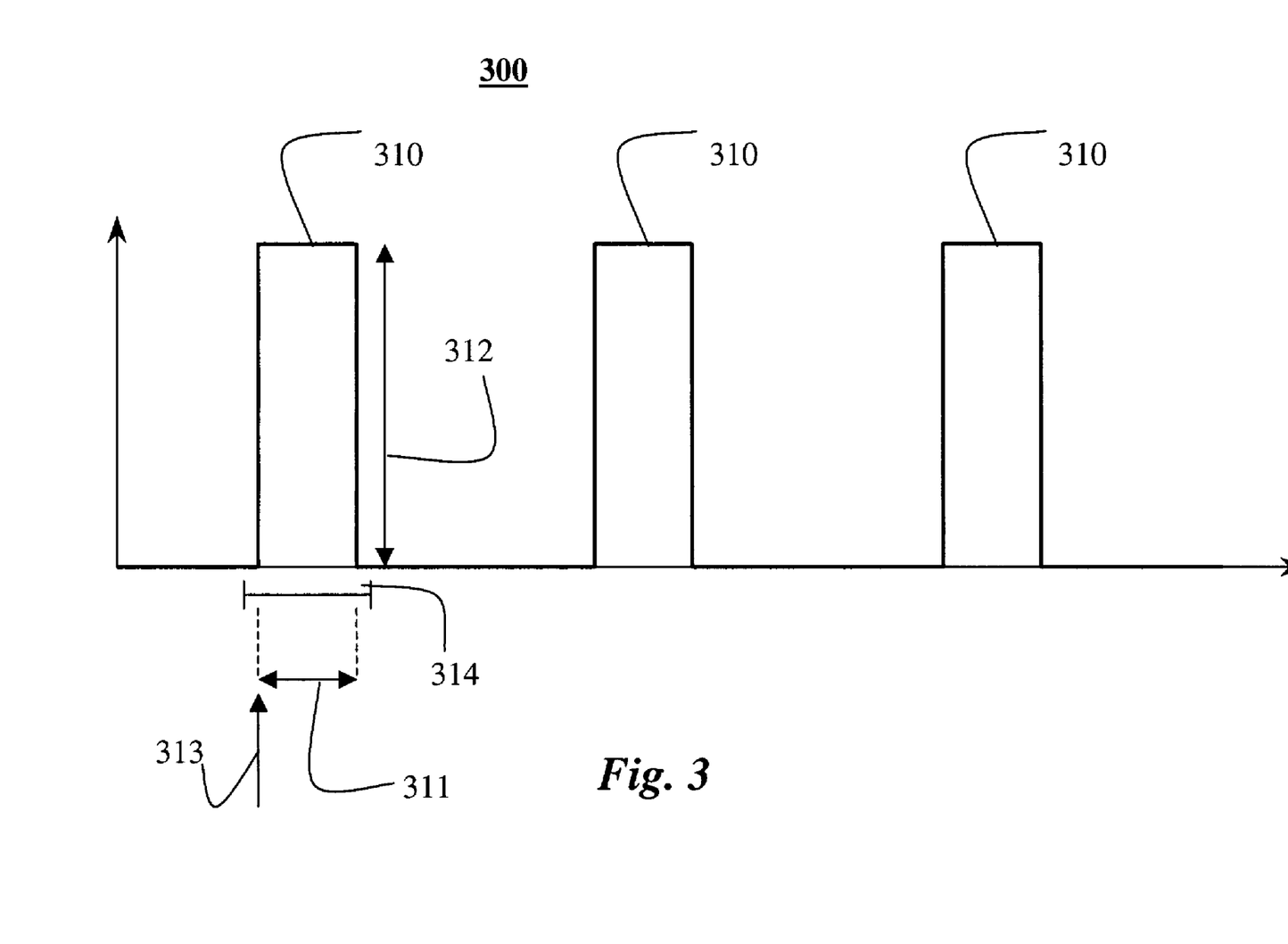
FIG. 3 is a timing diagram of bursts of TDMA radio signals.

FIG. 3 shows an example radio signal 300 from the mobile telephone 210 as it occurs according to an air interface standard based on time division multiple access (TDMA). The Figure shows the envelope of a transmitted radio signal. The modulation of the envelope of the transmitted radio signal is a function of time. Transmission occurs as a sequence of short bursts 310, where each burst 310 has a duration 311 and an amplitude 312, and begins at a time 313 within a predetermined time slot 314.

The beginning time 313, the amplitude 312 and the duration 311 of each transmitted burst are specified by the air interface standard, e.g., GSM. However, air interface standards generally allow a certain tolerance for the exact values of the beginning time, amplitude and duration parameters. For example, the standard may specify a nominal value and a tolerance for each parameter. As long as all parameters remain within the specified tolerances, the transmitter is free to vary any or all burst parameters as needed. For example, in the GSM air interface standard, the nominal duration of a "slot" is 576.52 µs, but the first 11.07 µs and the last 41.47 µs are considered "guard time." The actual burst must stay within its slot and is allowed to be as short as 523.98 µs. A GSM mobile telephone can alter the actual duration of a transmitted burst within this allowed range and still be considered compliant with the GSM standard. Also, for example, the mobile telephone can adjust the power of the transmitted radio signal within a certain range, as prescribed by the air interface standard. This allows the mobile phone to adjust the amplitude of a burst within the tolerances.

According to the invention, the message is encoded by varying the parameters of the transmitted signal within their allowed tolerances individually or in combination. For example, pulse position modulation (PPM) varies the beginning time 313 of each burst, and pulse width modulation (PWM) varies the duration 311. Amplitude modulation (AM) varies the amplitude 312 of each burst. These modulations of the envelope of the signal are detected by the envelope detector 220.

Code-division multiple access (CDMA) air interface standards also allow envelope variations in their transmitted radio signals. For example, according to the IS-95 CDMA air interface standard, transmission from a mobile telephone occurs in short bursts known as power control groups (PCG). Therefore, an IS-95 CDMA mobile telephone can modulate the parameters of the PCGs within their allowed tolerances for the purpose of encoding a message onto the signal envelope in a manner similar to that described for TDMA mobile telephones. Similar techniques are possible in other CDMA and non-CDMA air interface standards.

Envelope Modulation Through Burst Selection and Simulated Voice Activity

Most modern wireless air interfaces allow a mobile transmitter to transmit different types of bursts depending on communication needs. For example, in the GSM air interface standard, the mobile telephone transmits a shorter burst of 324.72 µs, instead of the standard 546.12-µs burst, during a "synchronization sequence." Therefore, envelope modulation can be done by transmitting longer or shorter bursts where the air interface standard allows the option to do so.

For example, the mobile telephone can transmit a short type of burst to send a bit value of 0, and a long type of burst to send a bit value of one. As another example, the mobile telephone is allowed to transmit bursts on the "random-access channel," also known as the paging channel. The timing of the bursts can be modulated by the pulse-position modulation technique. The bursts can be configured to contain information that is ignored by and cause no harm to the wireless network while the PPM-modulated timing of the bursts encode the message detectable by the envelope detector 220.

During a telephone call, the mobile telephone transmits bursts in time slots that occur at a rate of approximately 217 Hz in the GSM air interface standard. Because of the tolerance allowed by the standard, the mobile telephone can vary the duration of transmitted bursts by a small amount while maintaining compliance with the standard. For example the mobile telephone can occasionally transmit slightly shorter bursts. For convenience, the amount of shortening of the burst can be a multiple of the symbol period. Because the envelope detector 220 is relatively close to the phone 210, the signal-to-noise ratio (SNR) is high. Therefore, the timing of the bursts can be determined with sufficient accuracy to discriminate a burst that is shorter by just one symbol. For example, one burst every 120 ms can have either a normal length or a shorter length, thus encoding one binary digit of information at a rate of about eight bits or one byte per second.

During the telephone call, the mobile telephone is not required to send a burst in every allocated time slot. For example, in the GSM air interface standard, the mobile telephone is allowed to suspend most transmissions during "silent" periods, i.e., during periods of time when the user of the mobile telephone is not talking. During silent periods, the mobile telephone only transmits a few occasional bursts to keep the channel open. The envelope detector 220 can detect an absence or presence of a burst in a particular time slot and, accordingly, detect "voice activity" of the telephone user. The mobile telephone 210 can exploit this capability to encode the message for the envelope detector 220. By simulating voice activity, the mobile telephone can omit or include bursts in certain slots to, for example, encode a sequence of information bits that appears as normal voice activity without compromising the performance of the wireless network. The envelope detector 220 can reconstruct the information bits from the observed pattern of bursts.

It is an important advantage of the present invention that the envelope modulation is accomplished with a signal that appears as normal voice activity. A wireless telephone can use this invention to communicate to the envelope detector 220 while using existing wireless networks. No modifications are required in the wireless networks and no intervention is required by the wireless service providers.

Figure 4:
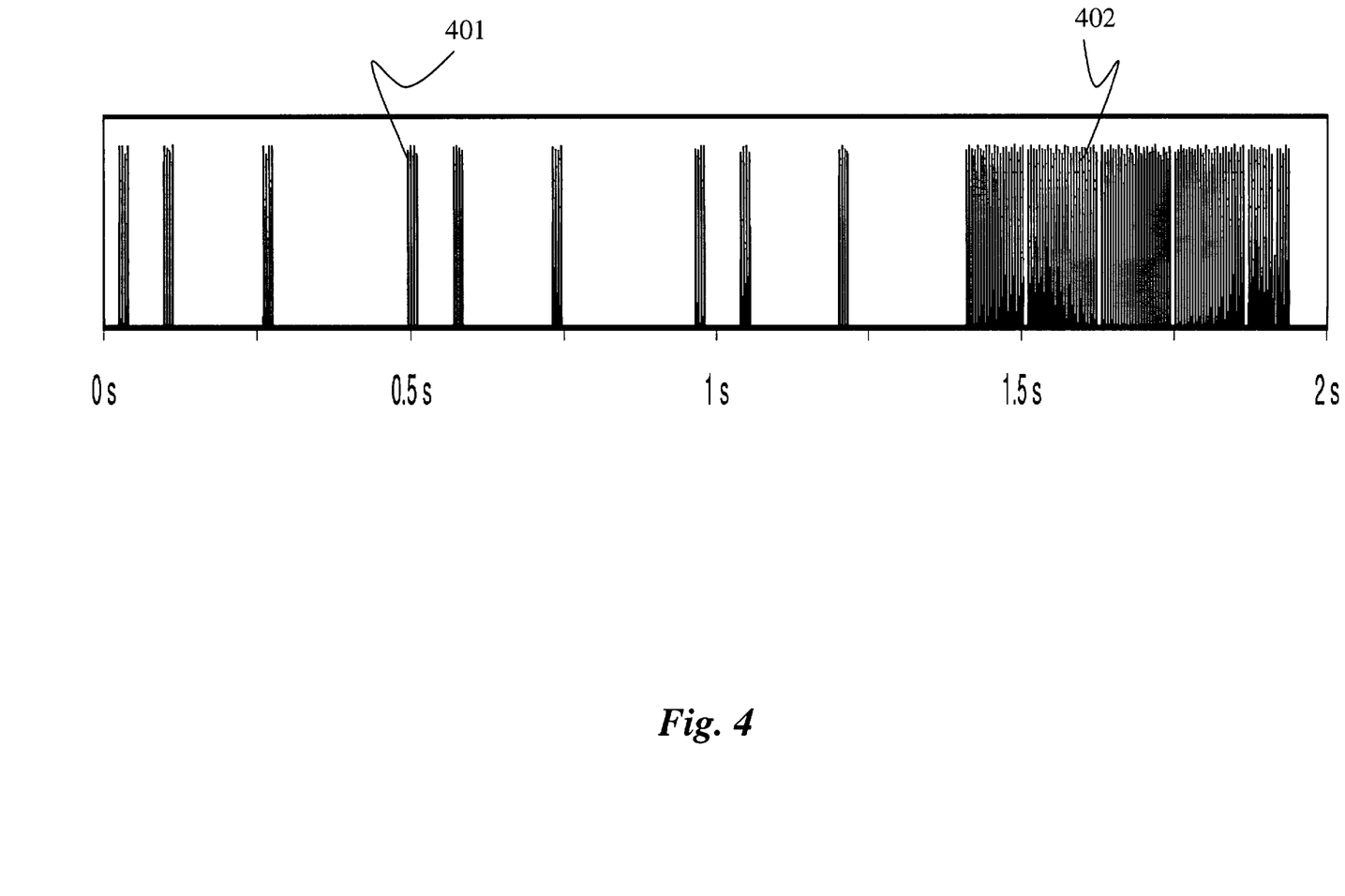
FIG. 4 is a timing diagram of bursts of a GSM radio signal.

FIG. 4 shows an example of bursty radio transmission that can be produced by a mobile telephone. The vertical axis represents radio signal envelope as a function of time. The specific example is for a GSM telephone. In the GSM standard, most bursts are slightly longer than ½ ms. Accordingly, in the scale of FIG. 4, where the horizontal axis spans two seconds of time, each burst appears as a narrow vertical line. FIG. 4 clearly shows several short blocks of bursts 401, which occur during call setup while no voice signal is being transmitted, followed by a more steady sequence of bursts 402 while a voice signal is transmitted. At that point, the mobile telephone produces short bursts of a radio frequency (RF) signal at a rate of about 217 Hz, which is the TDMA frame rate for GSM. This occurs because the voice-channel assignment is implemented by assigning a specific slot within the TDMA frame to the call, and the mobile telephone transmits a burst of radio energy in its assigned slot in most TDMA frames. FIG. 4 illustrates that the different patterns of burst transmission at different times are easily discernible by an envelope detector. Indeed, the envelope detector 220 is able to determine what type of activity is being performed by detecting and measuring the burst pattern.

One way to generate "simulated" voice activity is to produce an audio signal that has a spectral composition similar to the human voice. Alternatively, the audio signal can be a recorded voice signal. Also, the audio signal can be any waveform that is interpreted as voice by a voice encoder. By turning the audio signal on and off at specific times, the message can be encoded in a sequence of simulated talk spurts. The radio transmitter then transmits the radio signal in a pattern that follows the simulated talk spurts.

The successive bursts of the information-bearing signal are transmitted in the same time slot in successive frames. While one transmitter in a system is transmitting in one specific time slot, other transmitters are concurrently operating at the same frequency using other time slots within the frame. Other transmitters within the system are also concurrently operating in a similar manner at other carrier frequencies.

This description is in terms of the GSM air interface standard. However, many other air interface standards allow voice-activity gating. In particular, most second generation (2G) and all third generation (3G) mobile telephones allow voice-activity gating. It should be understood that the present invention can be applied to all air-interface standards that allow voice-activity gating of the transmitted radio signal.

Envelope Modulation in the Downlink

In most wireless air-interface standards, e.g., GSM and most CDMA-based standards, voice-activity gating of the transmitted signal can occur in both the uplink 111 and downlink 112. In addition, most wireless air interface standards define a predetermined frequency relationship between the uplink and the corresponding downlink, e.g. a fixed difference of 80 MHz in frequency and a separation of 1 ⅔ time slots between the TDMA slot assignments for the GSM standard in the USA. Therefore, the parameters of one link can be determined from the other link. In the GSM standard with frequency hopping, the frequency hopping pattern of one link can be determined by monitoring the frequency hopping pattern of the other link. In the CDMA-based IS-95 standard, a specific radio channel has a specific radio frequency assignment and a specific "Walsh Code" assignment. The frequency and Walsh-code assignments of one link can be determined from the frequency and Walsh-code assignments of the other link.

Voice activity in the uplink 111 is generated by the mobile telephone user. Voice activity in the downlink 112 is generated by the telephone equipment 130 to which the mobile telephone is connected. For example, in the system 200 of FIG. 2, voice activity in the downlink 112 is generated by automated answering unit 240. Therefore, envelope modulation of the downlink does not require any special action by the mobile telephone.

Figure 5:
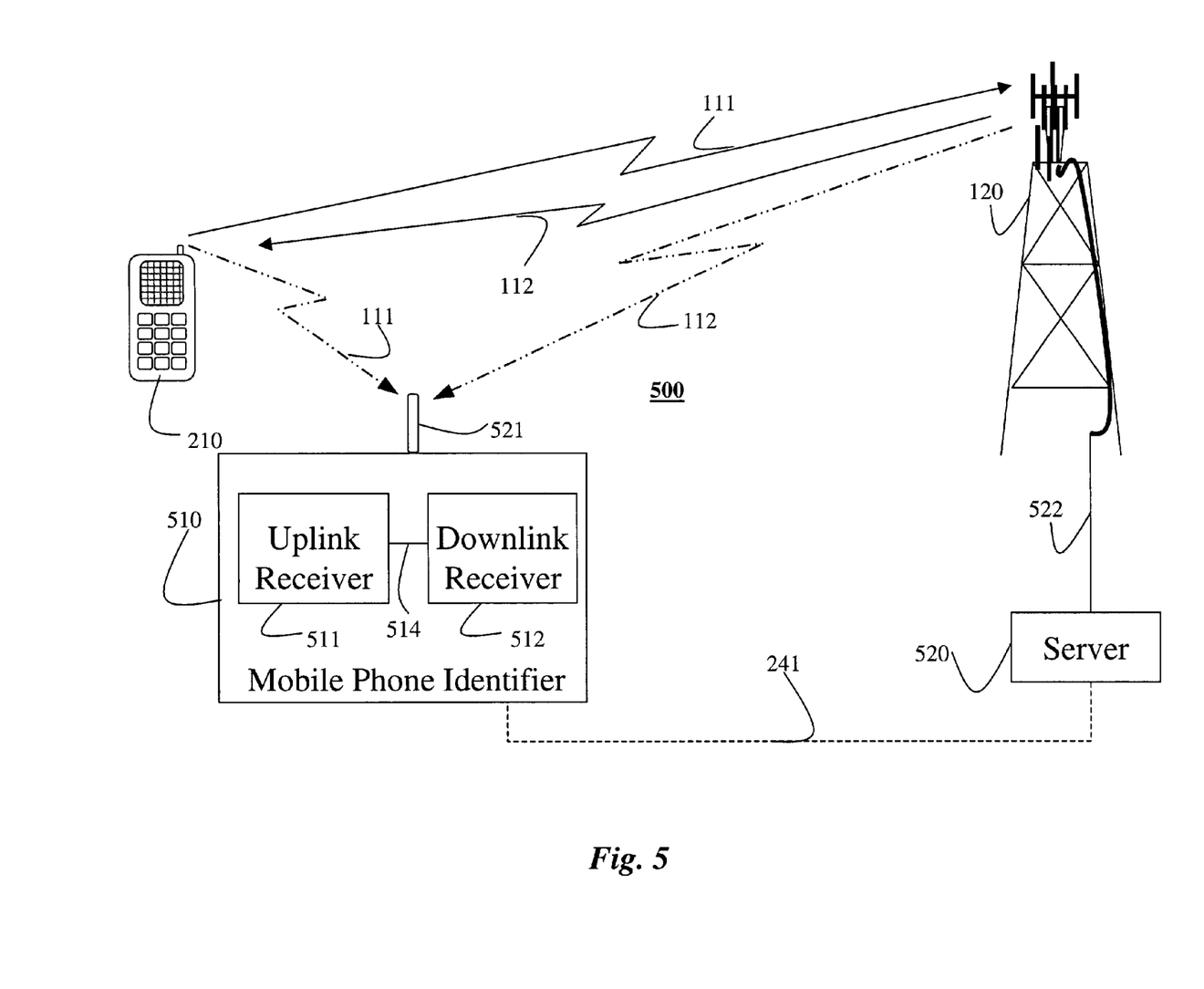
FIG. 5 is a diagram of a mobile telephone communication system employing baseband envelope modulation through simulated voice activity according to the invention.

FIG. 5 shows a system that takes advantage of envelope communication through simulated voice activity in the downlink 112. The system 500 includes a mobile transceiver 210, e.g., the mobile telephone 110, the base station 120, and a mobile phone identifier (MPI) 510. The mobile phone identifier 510 includes an uplink receiver 511, a downlink receiver 512 and an antenna 521. During a mobile telephone call, the user of the mobile telephone 210 has a two-way wireless point-to-point connection with telephone equipment, e.g., a server 520. For example, the connection can be provided by any wireless service provider, and is achieved, in part, through the uplink channel 111 and the downlink channel 112 and is completed through a telephone connection 522. Telephone connection 522 can be part of the public telephone network that carries normal telephone calls. For example, the connection can be established in well-known fashion by the mobile telephone 210 dialing a telephone number of the server 520.

The uplink receiver 511 and the downlink receiver 512 are adapted to accept received radio signals from the antenna 521, either from mobile telephone 210 or the base station 120. The uplink receiver 511 is also adapted to determine the carrier frequency and the time of occurrence of TDMA bursts of radio transmission that occur in the uplink radio signal 111. Depending on the air interface standard being used, the uplink link receiver 511 can measure additional parameters of the uplink link radio signal 111 such as, for example, the frequency hopping pattern or the Walsh code that is used. The uplink receiver 511 then provides the carrier frequency, the time of occurrence and any other observed parameters of uplink signal 111 to the downlink receiver 512 over a connection 514.

The downlink receiver 512 is adapted to accept the carrier frequency, time of occurrence and other parameters of the uplink radio signal 111 and determines a carrier frequency, time of occurrence and other parameters of the corresponding downlink radio signal 112. The downlink receiver 512 is further adapted to accept a received radio signal from antenna 521 and is also adapted to detect the downlink radio signal 112 transmitted by the base station 120. The downlink receiver 512 is able to extract a specific downlink radio signal from a multiplicity of downlink radio signals transmitted by the base station 120 on the basis of computed carrier frequency, computed time of occurrence and other computed parameters, obtained through connection 514 through techniques that are well known in the art. Finally, the downlink receiver monitors the activity of the downlink radio signal 112. As discussed above, the activity of the downlink radio signal 112 reflects the voice activity (real or simulated) of the server 520. The server 520 is thus able to encode a message for the mobile phone identifier 510 through simulated voice activity using voice-activity envelope modulation techniques according to the invention.

As with the system 200 of FIG. 2, the optional connection 241 can be advantageously used to improve security and performance. For example, the mobile phone identifier 510 can send a message to the server 520 to verify the accuracy of an identification message received over the downlink 112 through envelope modulation.

Alternative implementations that achieve the same results are possible. For example, separate antennas for the two receivers 511 and 512 can be used, the two receivers 511-512 can be combined.

System for Identifying and Authenticating a Mobile Transceiver

Figure 6:
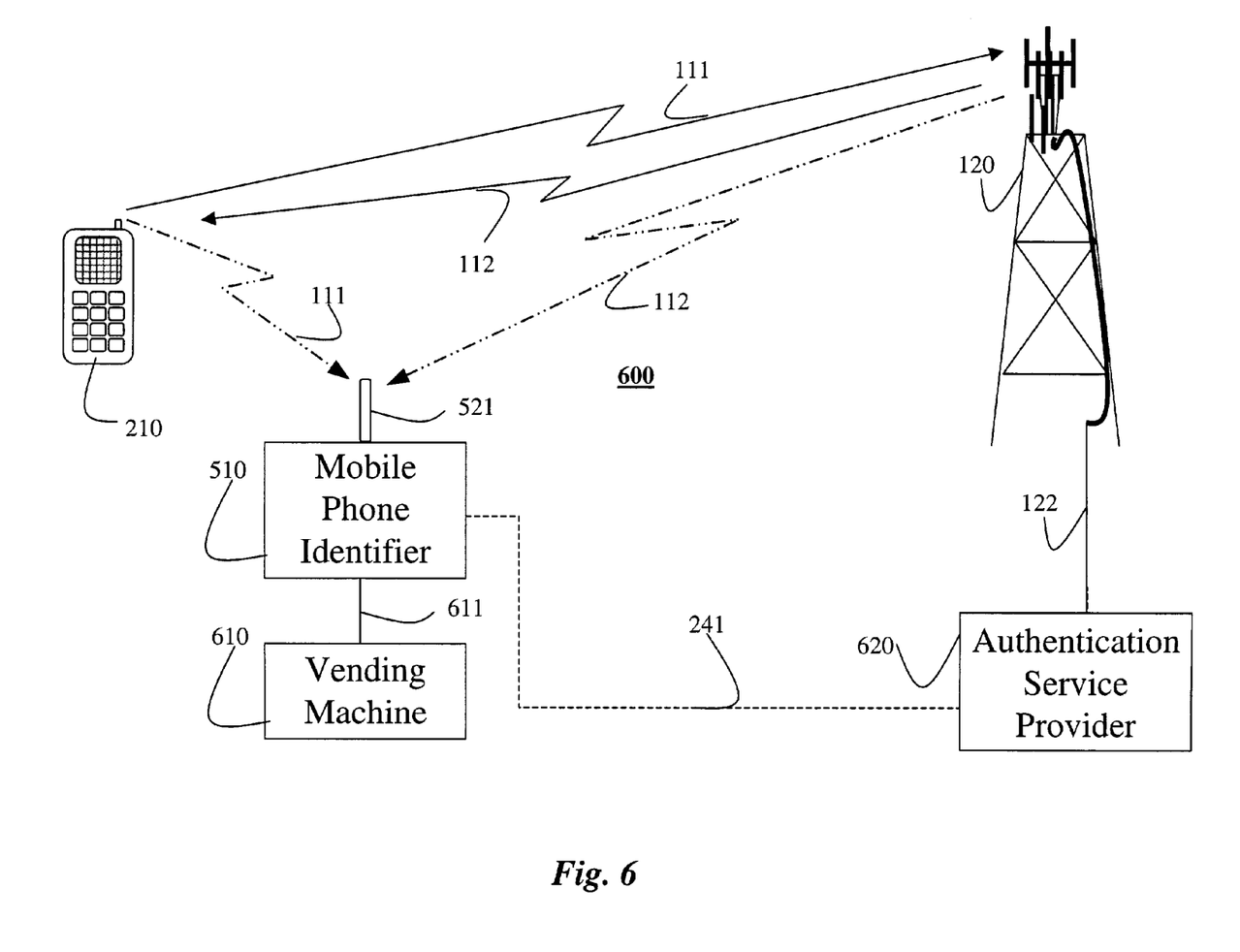
FIG. 6 is a diagram of a system for identifying and authenticating a mobile telephone according to the invention.

FIG. 6 shows a system 600 for identifying a mobile transceiver according to the invention. The system 600 includes a mobile transceiver 210, the base station 120, and the mobile phone identifier (MPI) 510. The MPI can be located at a place where a user of the mobile transceiver 210 would like to complete a transaction, e.g., make a purchase in a store, or buy goods or services from a vending machine.

The MPI 510 is coupled to a vending machine 610, e.g., an automated ticket dispenser at an airport, via a connection 611.

The base station 120 is connected to an authentication service provider (ASP) 620 through the connection 122 which is usually part of the public switched telephone network (PSTN). The MPI 510 and the ASP 620 can be interconnected via the connection 241.

In one embodiment of the invention, the mobile transceiver 210 is a mobile telephone that has the ability to modulate the envelope of the transmitted uplink signal 111 according to one or more of the baseband envelope modulation techniques described above. In such an embodiment, the mobile telephone uses such modulation techniques to encode an identification message for the mobile phone identifier 521. The mobile phone identifier verifies the identity encoded by the identification message through techniques well known in the art such as the techniques used to validate a credit card number when making a credit card purchase. For example, the mobile phone identifier can use the connection 241 to obtain an authorization from the ASP 620. If the verified identity is authorized to make a purchase, the mobile phone identifier 510 directs the vending machine 610 to dispense goods.

The ability of the mobile telephone 210 to modulate the baseband envelope of the transmitted uplink can be realized through modified firmware or hardware in the telephone itself. Alternatively, the ability can be realized by modifying software in a subscriber information module (SIM) card, also known a smart card. The use of SIM cards is a feature of the GSM air interface standard. The SIM card is inserted into the mobile telephone to control its functionality. The SIM card holds all of a subscriber's personal information and phone settings. In essence, it is the subscriber's authorization to use the network. It also holds the phone number, personal security key and other data necessary for the mobile telephone to function. The card can be inserted in any mobile telephone, making a particular telephone receive all calls to the subscriber's number. It is well known in the art how the software in a SIM card can be adapted to achieve the desired result.

In another embodiment of this invention, the mobile transceiver 210 is a prior-art mobile telephone. In such an embodiment, the user of the mobile telephone effects a transaction by calling a predetermined number using the mobile telephone. The predetermined number is assigned to the authenticator service provider 620. A wireless network, e.g., a GSM network sets up a wireless telephone connection to the ASP. The wireless network assigns a specific wireless channel to the call. According to the GSM standard, such a channel corresponds to a specific slot assignment within the 8-slot TDMA frame of GSM, and to a specific frequency assignment within the radio bandwidth allocated to the wireless service provider. If frequency hopping is used, the "frequency assignment" is really a pattern of frequencies in a pre-determined sequence. However, the basic concept remains the same.

In any case, the MPI 510 determines that a mobile telephone in the vicinity has placed a mobile telephone call by detecting a baseband envelope pattern in the uplink signal 111 transmitted by the mobile telephone while placing the call. The MPI 510 is unable to decipher the encrypted information in the uplink signal 111, but it can determine several parameters of the uplink signal 111. In particular it records the time of occurrence of the telephone call and it determines the wireless GSM channel that has been assigned to the mobile telephone by monitoring the position, in time, of the bursts of radio transmissions, and by measuring the frequency or pattern of frequencies. At this point, the MPI has determined that the mobile telephone is nearby, and what channel is being used by the mobile telephone. At the same time, the ASP 610 receives the phone call from the mobile telephone.

Figure 7:
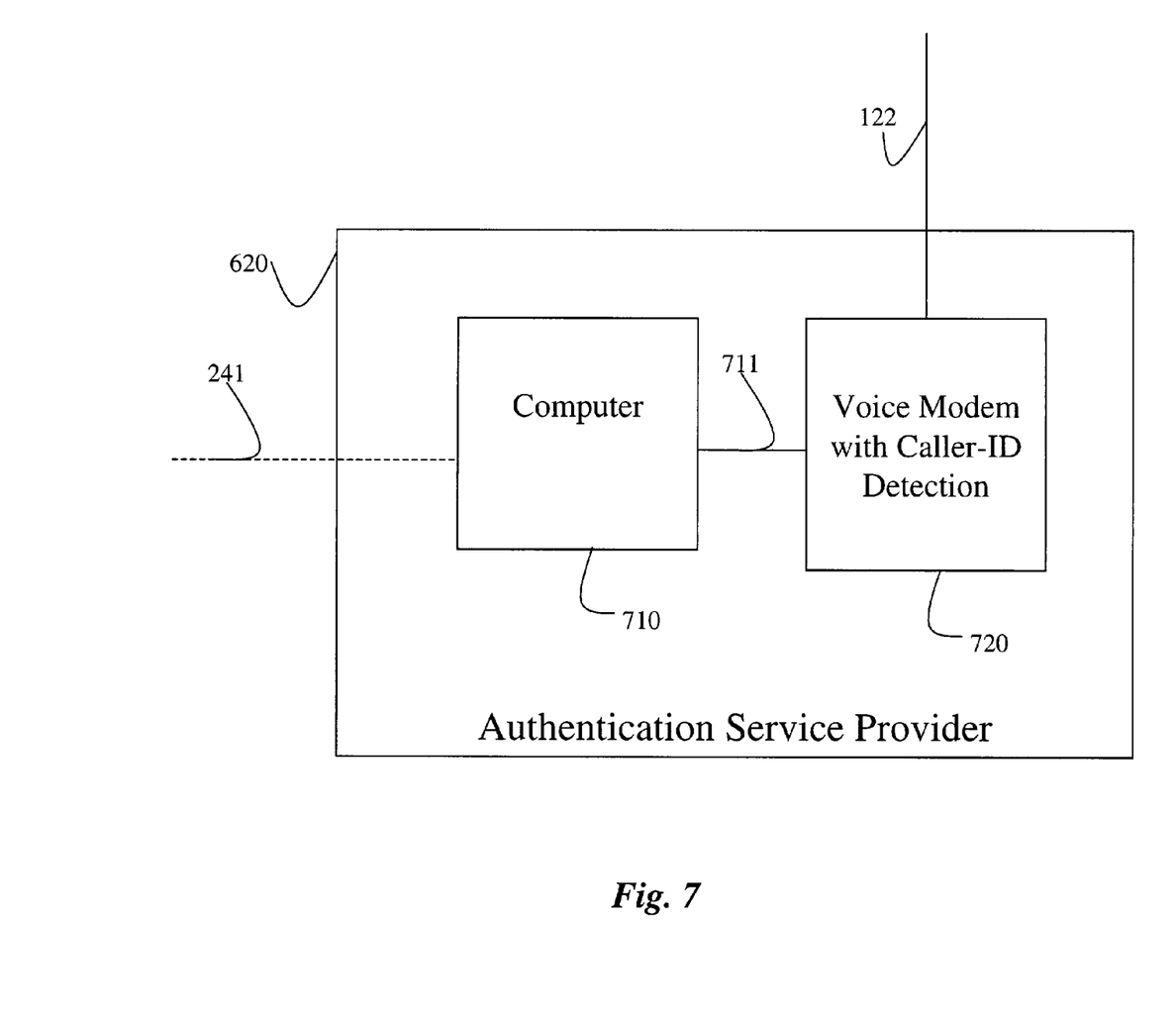
FIG. 7 is a block diagram of an authentication service provider.

FIG. 7 shows a block diagram of a possible implementation of the ASP 620. The ASP includes a computer 710 and a voice modem 720 with caller-ID detection interconnected by a connection 711. The voice modem with caller-ID detection is a commercially-available device with the capabilities of well-known voice-band computer modems. However, in addition to being able to answer an incoming telephone call on the telephone connection 122, it is also able to detect the caller-ID information accompanying the incoming telephone call. Furthermore, it is able to generate a voice signal and insert it into telephone connection 122 under control by the computer 710 through the connection 711.

By examining the caller-ID information that accompanies the telephone call, the ASP 610 determines the identity of the mobile telephone. This reduces the risk of fraud.

If the MPI 510 receives a user ID or other unique code in a decodable baseband-envelope-modulated message in the uplink signal 111, then the ID can be positively authenticated via the connection 241 with the ASP 620. Alternatively, because there is a well-defined and pre-determined relationship between the downlink signal and uplink signal of a wireless link, the MPI can also tune into the downlink signal 112 and can monitor the associated baseband envelope modulation to detect a message containing a user ID or an other unique code, such as an authentication code. This is accomplished, as described above, by the downlink receiver 512 on the basis of the observed parameters of the uplink signal 111.

The ASP 610 generates a simulated voice signal containing a pattern of voice activity. The pattern is structured so as to encode a message detected by the MPI 510 using the downlink receiver 512. The message is carried by the baseband envelope modulation of the downlink radio signal 112. The uniqueness of the association of the downlink radio signal 112 with the uplink radio signal 111 is assured by the wireless air interface standard, e.g., the GSM standard. Because of the uniqueness of the association, the risk of fraud and mistaken identification is reduced. The message is generated by the ASP on the basis of the caller-ID information and of other information that may be available about the user of the mobile telephone. The MPI learns the identity of the mobile telephone 210 from the message carried by the downlink radio signal 112 as described above.

The connection 241 is optional for completing the transaction. For example, the ASP can convey all the necessary information to the MPI through the baseband envelope modulation of the downlink signal 112. However, if the connection 241 is available, then the reliability, the speed, the privacy and the security of the transaction are improved. For example, in a situation where multiple MPIs are near each other, when the mobile telephone 210 makes a telephone call, the uplink radio signal 111 may be detected simultaneously by the multiple MPIs. If each MPI has the connection 241 to the ASP, each MPI can report to the ASP that the radio signal has been detected. Also, each MPI can report available information about the detected signal to the ASP. The reported information can include the strength of the detected signal.

The ASP examines the information received from multiple MPI's and selects the MPI which reports the largest signal strength. Then, using connection 241, the ASP sends a command to the selected MPI directing it to look for a specific code in the baseband envelope modulation of the downlink signal 112. The specified code can be a randomly picked value. If a different random value is picked each time, the risk of fraud or erroneous identification is reduced. If the selected MPI detects the specified code in the baseband envelope modulation of the downlink signal 112, then the identity of the mobile telephone 210 is confirmed positively.

After the MPI 510 achieves a reliable identification of the mobile phone 210 through one of the techniques described above, and obtains an appropriate authorization, the MPI commands the vending machine 610 to dispense goods.

Figure 8:
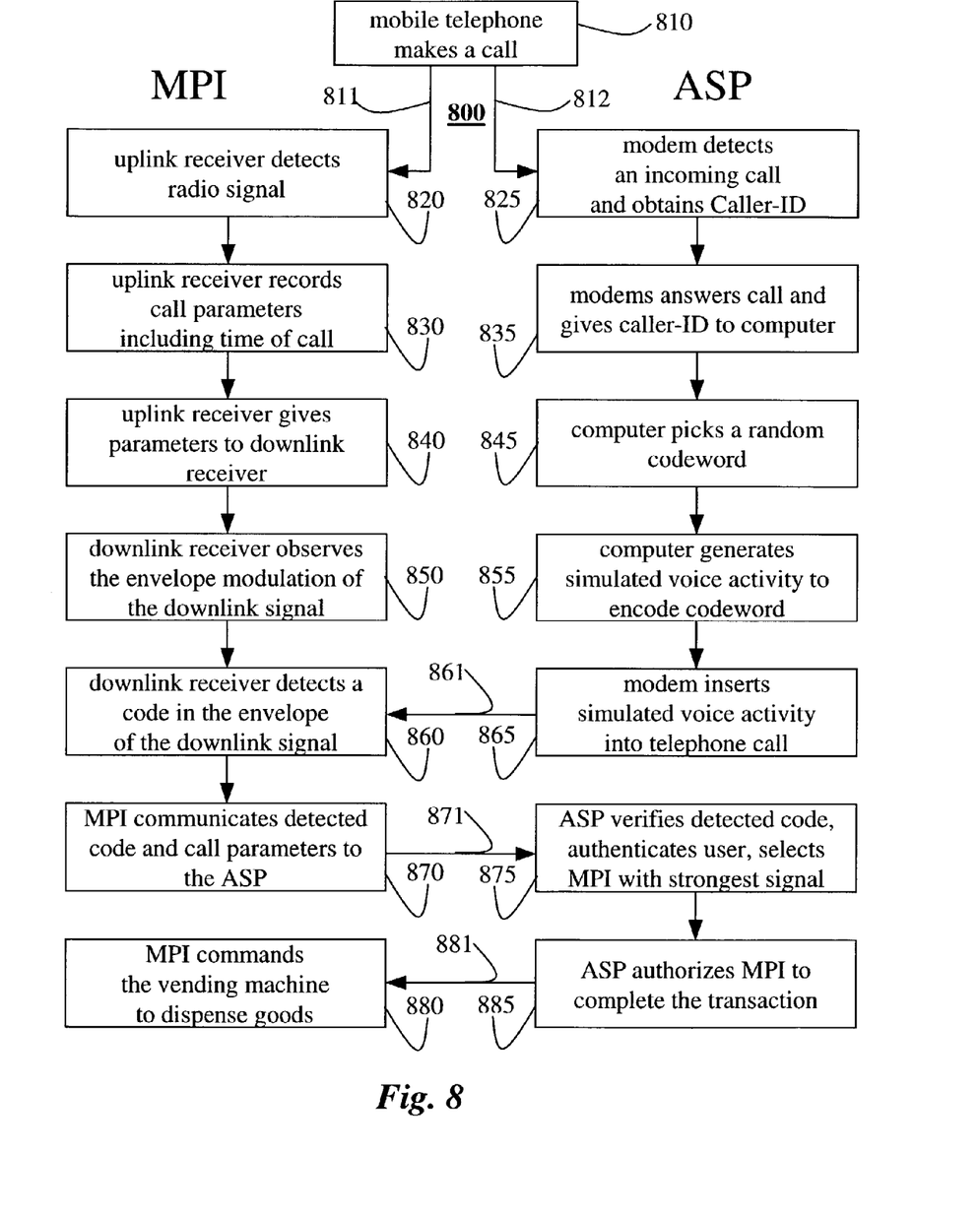
FIG. 8 is a flowchart of a method for identifying and authenticating a mobile telephone according to the invention.

FIG. 8 shows the steps and events of a method 800 for identifying and authenticating a mobile telephone according to the invention. The chain of events is initiated by the mobile telephone 210 making 810 a telephone call to the ASP 620. The steps 820, 830, 840, 850, 860, 870 and 880 show actions taken by the MPI 510. The steps 825, 835, 845, 855, 865, 875 and 885 show actions taken by the ASP 620. The arrows in FIG. 8 show causal relationship. In particular, arrow 811 is supported by communication through baseband envelope detection of the uplink radio signal 111; arrow 812 is supported by communication through a wireless telephone call according to a wireless air interface standard, e.g., the GSM standard; arrow 861 is supported by communication through baseband envelope detection of a simulated voice activity on the downlink radio signal 112; and arrows 871 and 881 are supported by communication through the optional connection 241. All the other arrows are supported by communications internal to the MPI or to the ASP. The text in the boxes is self explanatory and describes the functions performed by the various boxes.

While the description of this invention refers to mobile telephones, many of the techniques are applicable to other kinds of wireless terminals. Specifically, data terminals that transmit a radio signal as a sequence of bursts, will be able to vary the parameters of those bursts as needed to encode a message. In cases where a data terminal receives data by means of a radio signal arranged as a sequence of one or more bursts, it may be possible for the source of the data to manipulate the timing and quantity of the data in such a way as to achieve a specific pattern of envelope variations which, then, may convey a message.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

I claim:

1. A method for communicating messages using a radio signal, comprising:
    transmitting a radio signal according to an air interface standard for wireless radio communications by a transmitter, where the transmitter is either a mobile telephone or a base station;
    modulating a carrier of the transmitted radio signal while maintaining compliance with the air interface standard to send a first message to a first receiver compliant with the air interface standard, where the first receiver is either a base station if the transmitter is a mobile telephone, or a mobile telephone if the transmitter is a base station;
    modulating a baseband envelope of the transmitted radio signal while maintaining compliance with the air interface standard to send a second message to a second receiver, where the second receiver is a baseband envelope detector, the modulating of the carrier occurs concurrently with the modulating of the baseband envelope, and the second message contains an identification of the mobile telephone; and
    adjusting a sensitivity of the second receiver to require the transmitter to be within a predetermined distance of the second receiver.

2. The method of claim 1 wherein the air interface standard uses time division multiple access.

3. The method of claim 1 wherein the air interface standard uses code division multiple access.

4. The method of claim 1 further comprising:
    modifying durations of bursts of the radio signal to modulate the baseband envelope.

5. The method of claim 1 further comprising:
    modifying times of occurrences of burst of the radio signal to modulate the baseband envelope.

6. The method of claim 1 further comprising:
    modifying an amplitude of bursts of the radio signal to modulate the baseband envelope.

7. The method of claim 1 further comprising:
    modifying a number of the bursts of the radio signal to modulate the baseband envelope.

8. The method of claim 1 further comprising:
    sending the radio signal as burst including a first type of burst and a second type of burst to modulate the baseband envelope.

9. The method of claim 1 further comprising:
    simulating voice activity in the radio signal to modulate the baseband envelope.

10. The method of claim 1, in which the transmitter is a base station and the second receiver detects parameters of an uplink channel of the transmitter to determine a downlink channel of the transmitter.

11. The method of claim 10 wherein the detected parameters include a carrier frequency and a time division multiple access slot.

12. The method of claim 10 wherein the detected parameters include a time of occurrence of a burst of transmission.

13. The method of claim 10 wherein the detected parameters include a frequency-hopping pattern.

14. The method of claim 10 wherein the detected parameters include a Walsh code.

15. The method of claim 1 wherein the second message contains a unique code.

16. The method of claim 15 wherein the unique code is an authentication code for a commercial transaction.

17. The method of claim 15 wherein the unique code is provided by an automatic answering unit.

18. The method of claim 1 wherein the predetermined distance is less than a meter.

19. The method of claim 1 wherein the predetermined distance is less than five centimeters.

20. The method of claim 1 wherein the second receiver includes an uplink receiver and a downlink receiver.

21. The method of claim 1 wherein the second receiver is connected to an automated vending machine, and further comprising:
    completing a transaction in the vending machine in response to receiving the second message in the second receiver.

22. The method of claim 1 wherein the second receiver is connected to a cash register, and further comprising:
  completing a transaction in the cash register machine in response to receiving the second message in the second receiver.

23. The method of claim 1 further comprising:
  verifying the second message in a server; and
  notifying the second receiver of the verification.

24. The method of claim 23 wherein the server is connected to the base station.

25. The method of claim 1 wherein the transmitter includes a subscriber information module card to perform the modulating.

26. The method of claim 1 further comprising:
  examining caller-ID information associated with the transmitter.

27. The method of claim 1 wherein the modulating of the carrier uses digital phase-shift keying.

* * * * *